Figure 1:
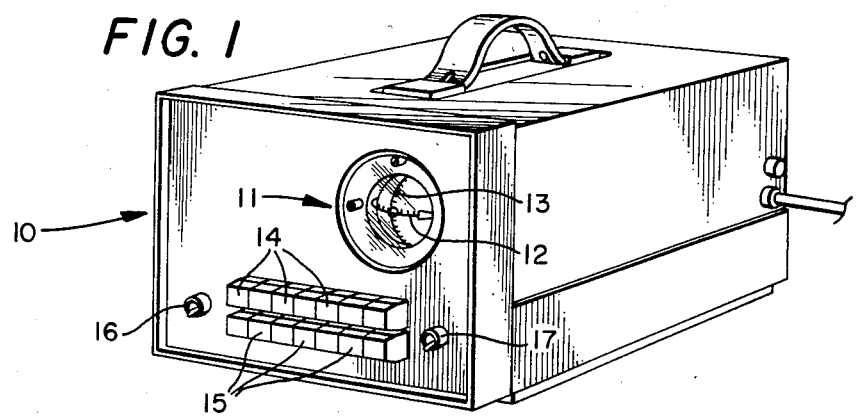

United States Patent [19]

Williams et al.

[11] Patent Number: 4,561,188
[45] Date of Patent: Dec. 31, 1985

[54] GRADE AND SLOPE ATTITUDE GYROSCOPIC DRIVEN INDICATOR FOR HEAVY EARTH MOVING EQUIPMENT

[76] Inventors: Robert L. Williams, 1357 Kathryn Ct., Hurst, Tex. 76053; James R. Garrett, 1836 Castille Dr., Carrollton, Tex. 75007

[21] Appl. No.: 691,391

[22] Filed: Jan. 14, 1985

[51] Int. Cl.⁴ .............................................. G01C 9/06
[52] U.S. Cl. ...................................... 33/366; 33/318; 33/329; 33/333
[58] Field of Search ............. 33/329, 328, 316, 317 R, 33/318, 333, 363 R, 1 E, 366; 73/178 R

[56] References Cited

U.S. PATENT DOCUMENTS

| | | | |
|---|---|---|---|
| 2,821,695 | 1/1958 | Strock et al. | 33/329 |
| 3,395,576 | 8/1968 | Kuiper et al. | 33/328 |
| 4,486,844 | 12/1984 | Brunson et al. | 33/366 |
| 4,515,221 | 5/1985 | van der Lely | 33/318 |

*Primary Examiner*—Willis Little
*Attorney, Agent, or Firm*—Warren H. Kintzinger

[57] ABSTRACT

A gyroscopic referenced electronically operated grade and slope attitude indicator enabling a heavy equipment operator to build a slope and/or grade by visual readout. It is a system using a gyro output to compute the grade and slope for display thereof on a dual steering bar indicator. An angle calibration along with cancelling switches allows an equipment operator a selection of slope and grade ratios to work to in a work approach making staking and restaking of a slope and/or grade unnecessary other than for a surveyed starting point with a toe-stake or its equivalent.

18 Claims, 13 Drawing Figures

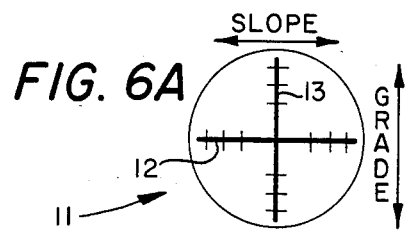

FIG. 6A

SLOPE = CORRECT
GRADE = CORRECT
ACTION = NONE

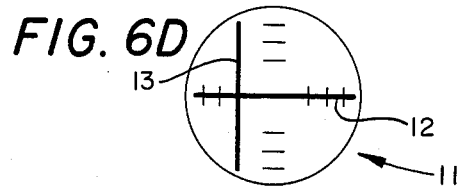

FIG. 6D

SLOPE = LEFT TRACK SIDE TOO HIGH
GRADE = CORRECT
ACTION = POWER TILT BLADE LEFT

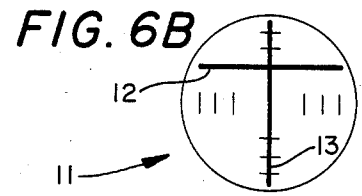

FIG. 6B

SLOPE = CORRECT
GRADE = ABOVE YOU
ACTION = LIFT BLADE TO ADD MATERIAL

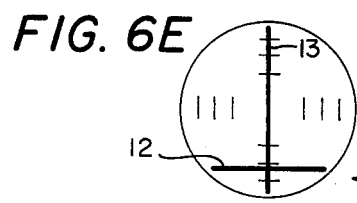

FIG. 6E

SLOPE = CORRECT
GRADE = BELOW YOU
ACTION = DROP BLADE TO REMOVE MATERIAL

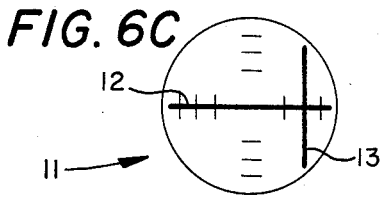

FIG. 6C

SLOPE = RIGHT SIDE TOO HIGH
GRADE = CORRECT
ACTION = POWER TILT BLADE RIGHT

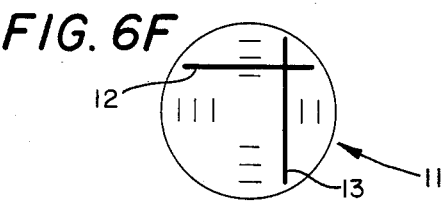

FIG. 6F

SLOPE = RIGHT SIDE TOO HIGH
GRADE = ABOVE YOU
ACTION = YOU ARE DIAGONAL TO THE SLOPE OR GRADE - PICK ONE OR THE OTHER TO CORRECT.

GRADE AND SLOPE ATTITUDE GYROSCOPIC DRIVEN INDICATOR FOR HEAVY EARTH MOVING EQUIPMENT

This invention relates in general to building slope and grade with heavy earth moving equipment, and more particularly, to a grade and slope attitude gyroscope reference indicator for heavy earth moving equipment.

Cutting grade and slope angles through earth for earth shaping in many construction projects including earthern dams and road grading has generally required extensive surveying with multiple staking and restaking required to insure proper slope and grade in a finished job. This can be both time consuming and expensive with heavy earth moving equipment such as dozers and scrapers tied up longer than desired. Furthermore, such work requires expenditure of great quantities of fuel with the driving energy demands imposed.

It is therefore a principal object of this invention to make earth grade and slope cutting with heavy earth moving equipment more efficient.

Another object of this invention is to minimize grade and slope surveying and staking requirements.

A further object is to meet grade and slope earth shaping tolerance requirements.

Still another object is to minimize earth moving equipment tie up time and fuel consumption for enhanced economy in doing the job.

Features of the invention useful in accomplishing the above objects include, in a grade and slope attitude gyroscopic driven indicator for heavy earth moving equipment, a gyroscope referenced electrically operated grade and slope attitude indicator enabling a heavy equipment operator to build a slope and/or grade by visual read out with the gyro output used to compute the grade and slope for display thereof on a dual steering bar indicator. An angle calibration along with cancelling switches allows on equipment operator a selection of slope and grade ratios to work to in a work approach making staking and restaking of a slope and/or grade unnecessary other than for a surveyed starting point with a toe-stake or its equilavent.

Specific embodiments representing what are presently regarded as the best modes of carrying out the invention are illustrated in the accompanying drawings.

Figure 2:
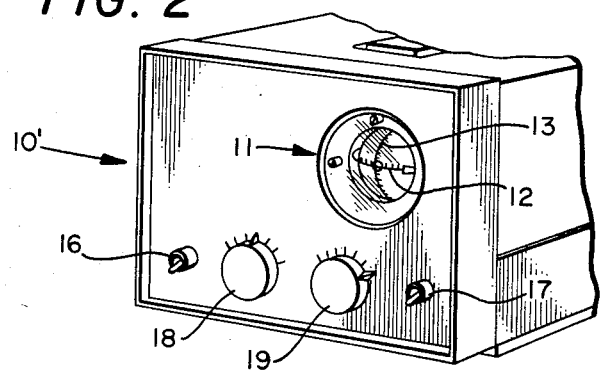
Figure 3:
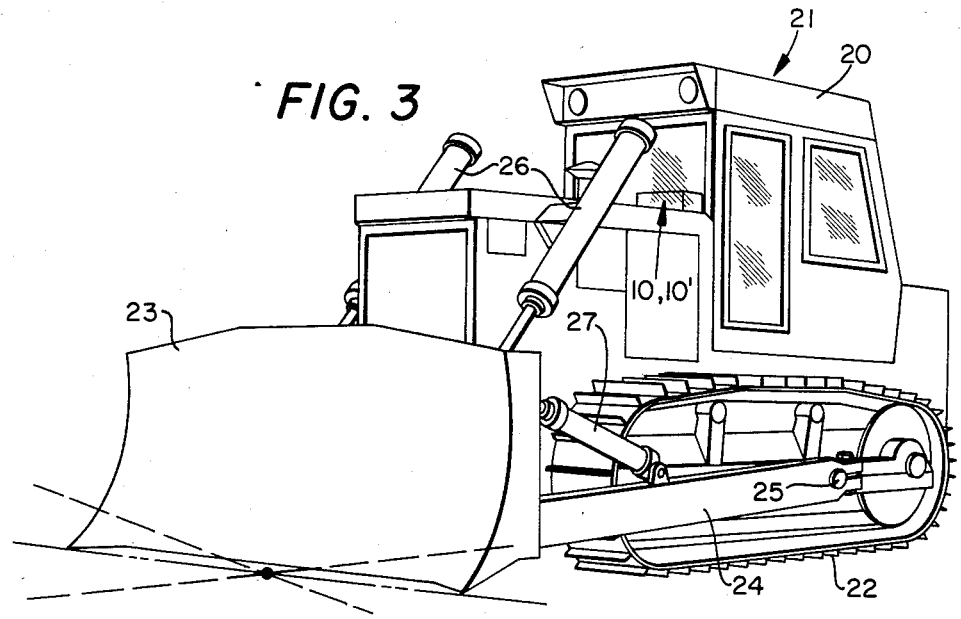
Figure 4A:
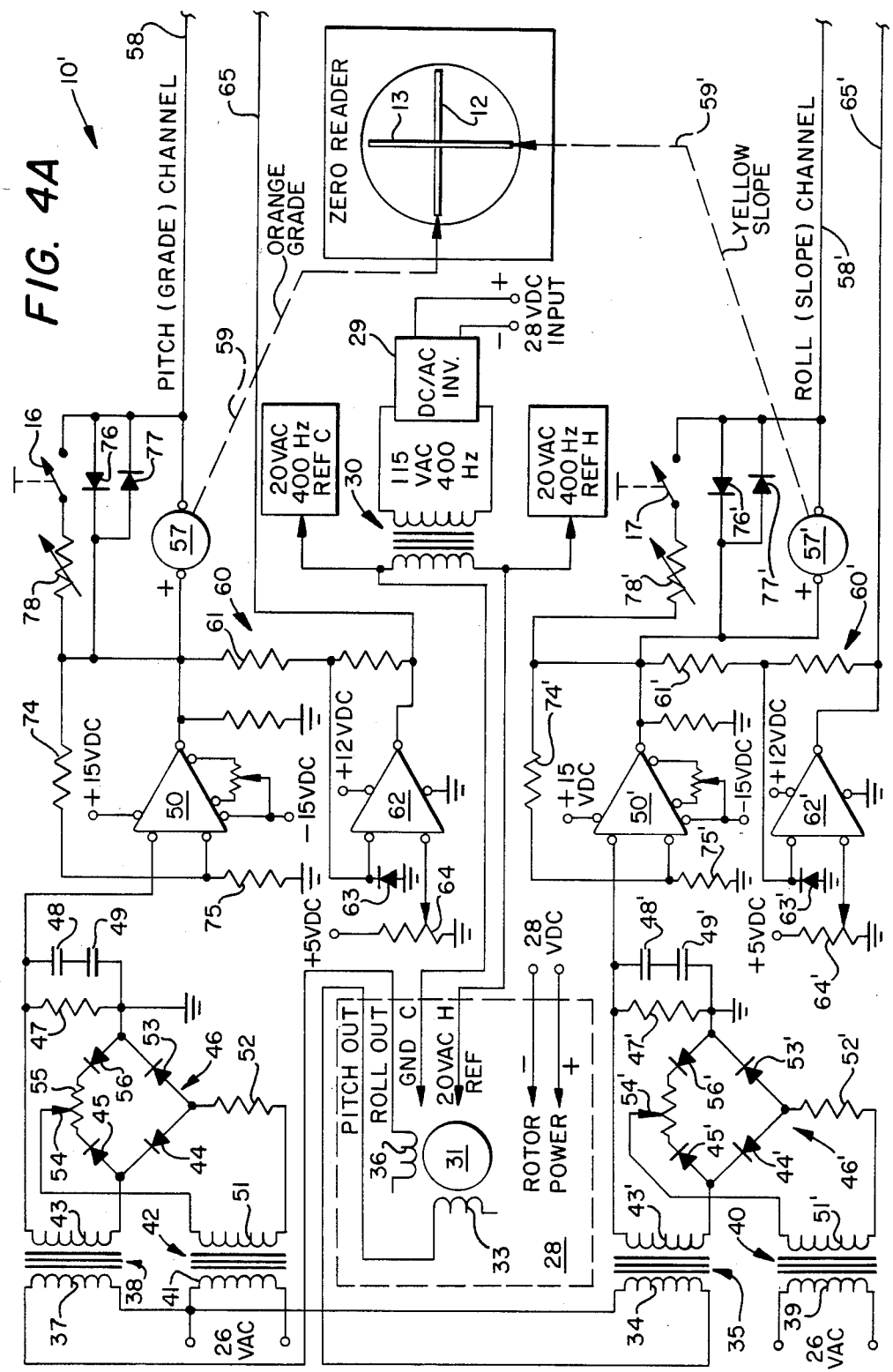
Figure 4B:
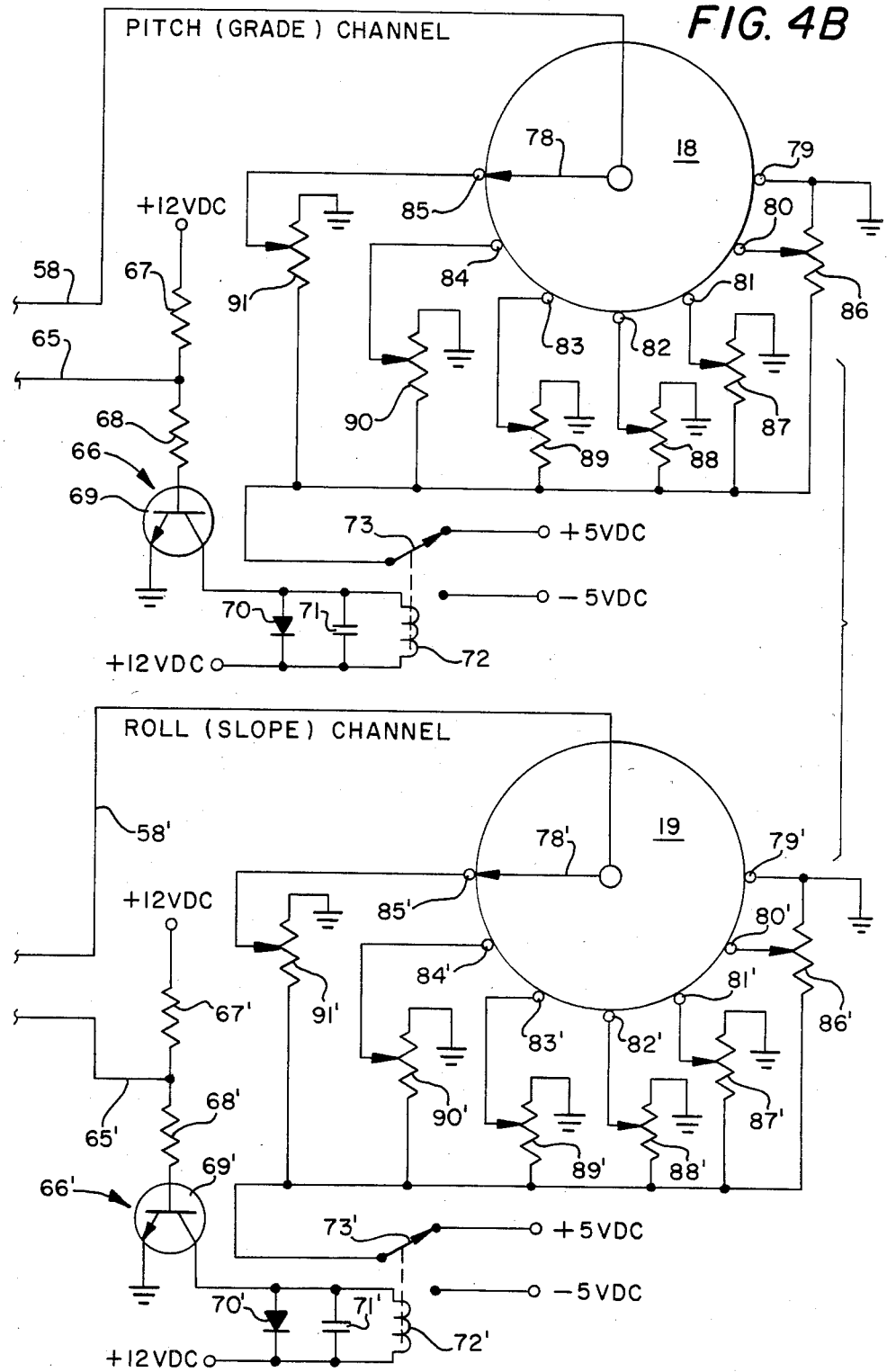
Figure 5:
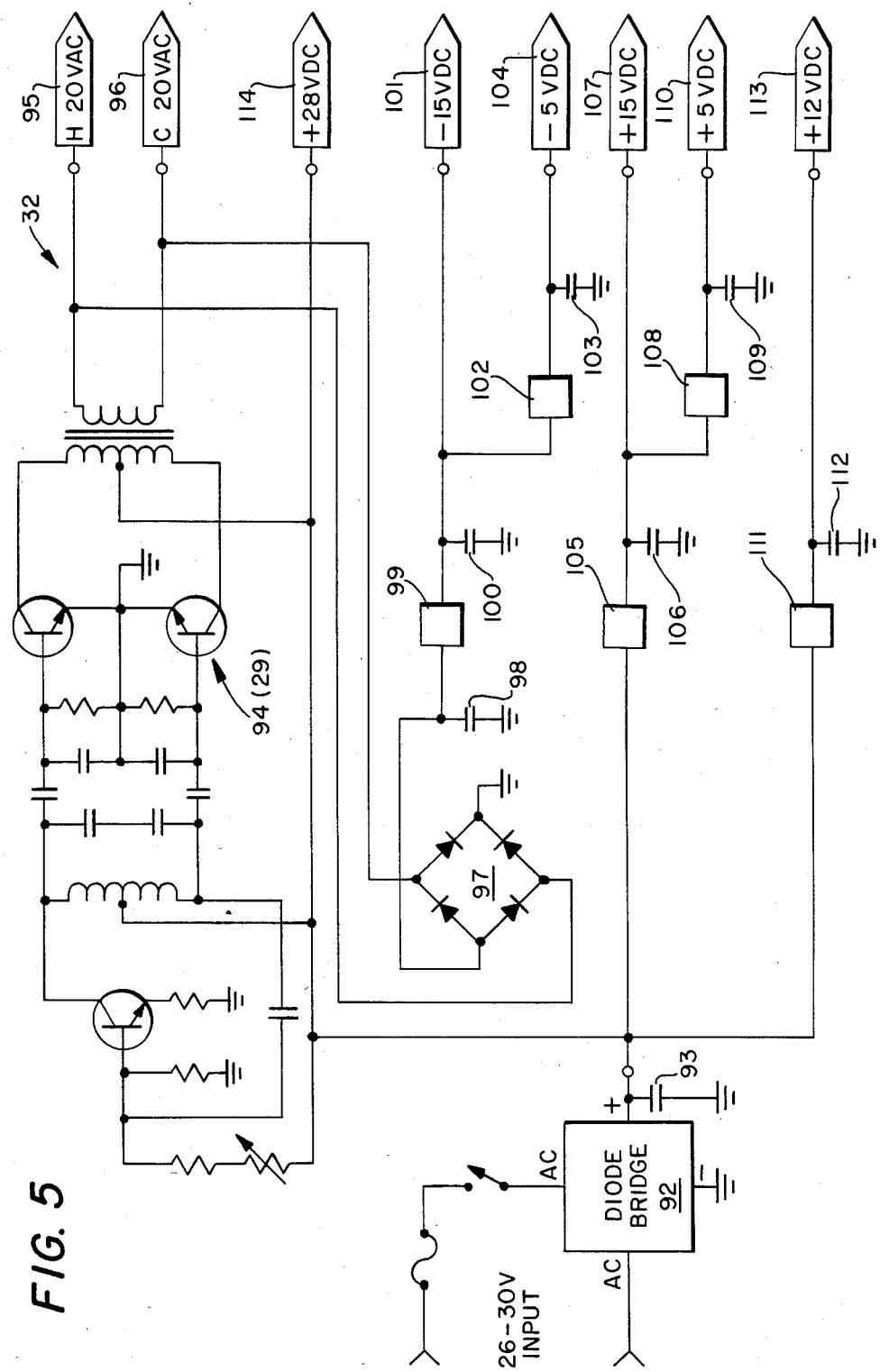
Figure 7:
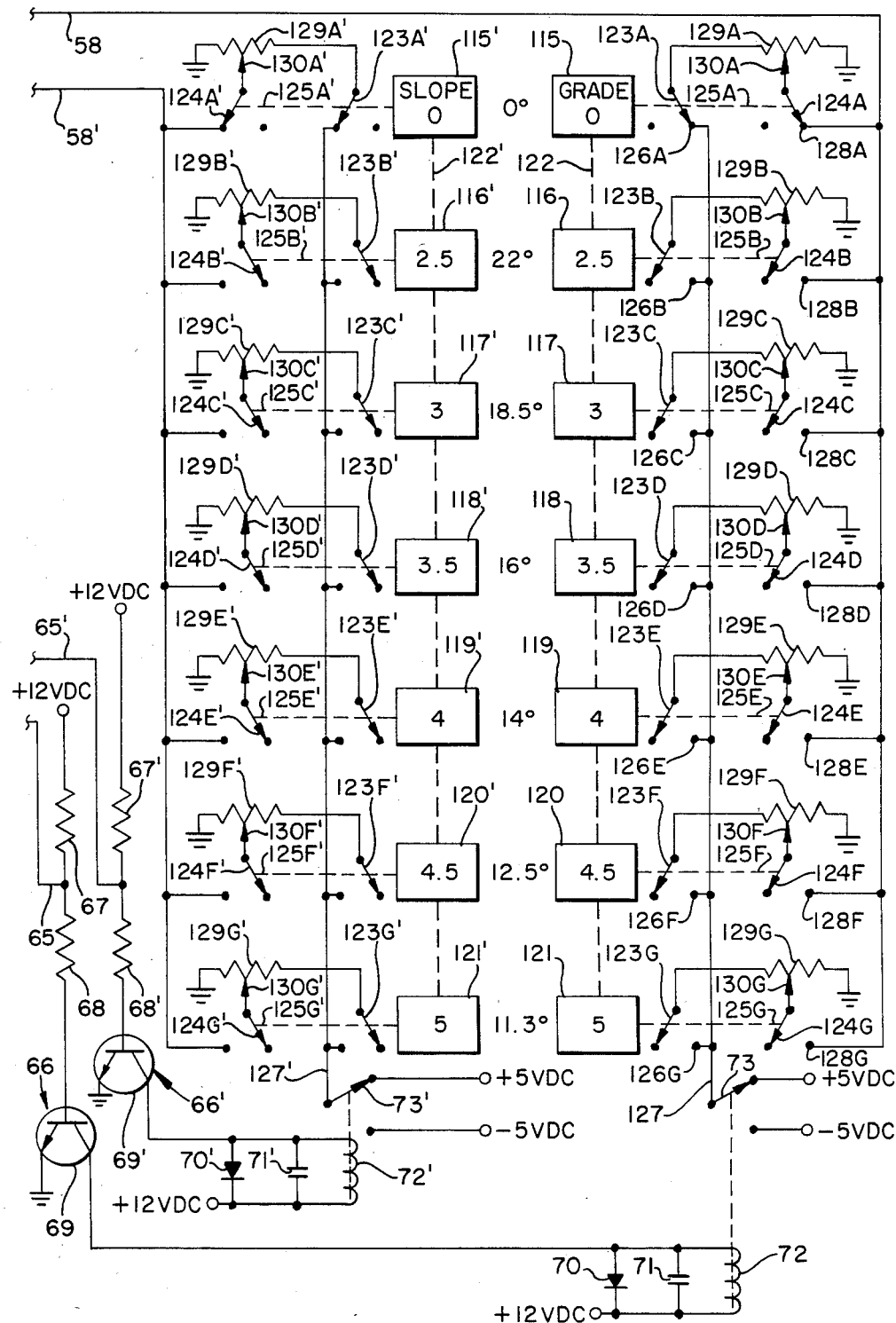

In the drawings:

FIG. 1 represents a perspective view of an electronically operated grade and slope attitude gyroscopic driven indicator for heavy earth moving equipment with digital push button cancelling switches;

FIG. 2, a partial perspective view of an electronically operated grade and slope attitude gyroscope driven indicator for heavy earth moving equipment with rotary cancelling switches;

FIG. 3, a front angled perspective view of a blade equipped bulldozer with a grade and slope attitude gyroscopic driven indicator such as the indicator of FIG. 1 or alternatively of FIG. 2 installed in the cab;

FIGS. 4A and 4B, a schematic diagram of the electronically operated grade and slope attitude gyroscopic driven indicator system with the rotary cancelling switches of FIG. 2;

FIGS. 5, a block schematic diagram of a power supply for the gyroscopic driven indicator system of FIG. 4;

FIGS. 6A-F, indicator slope and grade bar states indicating slope and grade attitudes of the earth mover using the indicator with various bar deviation indications telling what adjustment needs to be done with the blade of the earth mover; and, FIG. 7, a schematic diagram of the push button switch section that may be used in place of the rotary cancelling switch section of the gyroscopic driven indicator system of FIG. 4 for the digital push button cancelling indicator system of FIG. 1.

Referring to the drawings:

The electronically operated grade and slope attitude gyroscopic driven indicator 10 of FIG. 1 is shown to be a unit with a zero reader indicator 11 having a grade indication horizontal bar 12 and a slope indication vertical bar 13. The indicator 10 of FIG. 1 is also equipped with push button cancellation and deviation sensitivity grade push button switches 14 and slope push button switches 15 and grade channel and slope channel sealed activation switches 16 and 17, respectively. With the electronically operated grade and slope attitude gyroscopic driven indicator 10' of FIG. 2 rotary cancellation and deviation sensitivity grade switch 18 and rotary slope switch 19 are used in place of the push button switches 14 and 15 of the FIG. 1 embodiment.

Either of the indicator 10 or 10' embodiments would be placed within the cab 20 of the earth mover 21 such as a track 22 driven bull dozer equipped with an earth moving blade 23 as shown in FIG. 3. The blade 23 has typical pivotal boom 24 pivot mountings 25 and hydraulic power cylinders 26 for raising and lowering and 27 for tilting of the blade 23.

Referring to FIGS. 4A and 4B schematic diagram the grade and slope attitude indicator 10 is shown to include an electrically driven gyroscope 28 that has conventional voltage power and reference inputs from DC to AC inverter 29 as transformed through transformer 30 to 20 volts AC, and 28 volt DC rotor 31 power from the voltage power supply 32 of FIG. 5. The pitch (grade) E.l. pickoff 33 is connected to the pitch signal input primary coil 34 of transformer 35 and the roll (slope) E.l. pickoff 36 is connected to the roll signal input primary coil 37 of transformer 38. A reference AC voltage is applied to the primary coil 39 of the roll (slope) channel transformer 40 and the same reference AC voltage is also applied to the primary coil 41 of the pitch (grade) channel transformer 42. The secondary output coil 43 of grade channel transformer 38 is connected to the junction of diodes 44 and 45 of diode bridge 46 and through resistor 47 in parallel with series connected capacitors 48 and 49 to ground, and also also as an input to op amp (operational amplifier) 50. The secondary coil 51 of transformer 42 is connected through resistor 52 to the junction of diodes 44 and 53 of diode bridge 46 and to the adjustable tap 54 of potentiometer 55 interconnecting the cathodes of bridge diodes 45 and 56. The junction of diodes 53 and 56 is connected to ground. The output of the top amp 50 as part of the pitch (grade) channel is connected as a positive level input to a sensitive meter movement 57 voltage reference connected on the other side to channel line 58. the meter movement 57 is drive connected through linkage 59 to drive position grade indication horizontal bar 12 in the same manner as with aircraft gyroscope pick off positioned meter movement driven roll and bank instruments. The output of op amp 50 is also connected to a circuit network 60 including connection through resistor 61 to an input to op amp 62 and to the cathode of diode 63. A reference voltage set on potentiometer 64 is applied as a reference voltage input to the op amp 62 that with fluctuation of voltage levels out of op amp 62 through a predetermined set threshold level causes the op amp 62 to apply a voltage through its output line 65. This acting through the voltage divider switching circuit 66 including resistors 67 and 68 and NPN transistor 69, activates the relay coil circuit with diode 70, capacitor 71 and coil 72 to throw relay switch 73 from positive voltage to negative voltage and back through the threshold in reverse. This is consistent with movement of the horizontal grade bar 12 up or down from the center zero position.

The output of op amp 50 has a connection through series connected resistors 74 and 75 to ground with the junction of the resistors 74 and 75 connected as an additional feed back input to the op amp 50. The output of op amp 50 is also connected through voltage level limiting diodes 76 and 77, in parallel but reversed in orientation one from the other, to grade channel line 58. This protects the sensitive meter movement 57 from excess extremes of voltage in both directions. The output of op amp 50 is also serially connected through adjustable resistor 78 and grade channel switch 16 to the grade channel line 58. The line 58 is connected to the rotary contact 78 of rotary switch 18 that is switchable from contact 79 that is connected to ground through a plurality of switches 80–85 that are set at various reference voltages via the taps of potentiometers 86–91 that are connected between a plus voltage or a minus voltage, dependent on the state of switch 73, and ground in order to give the horizontal grade bar 12 a deflected state setting such as, respectively 0°, 22°, 18.5°, 16°, 14°, 12.5°, and 11.3° to which the earth mover may be such angled state bring the horizontal grade bar 12 back to the zero (center) position. This is with the electronically operated grade and slope attitude gyroscopic driven indicator 10 having been positioned in the earth moving vehicle in a level state both in pitch and roll relative to the vehicle frame and tracks (or supporting wheels) or with the system adjusted to indicate the zero or level state when the vehicle is level both in pitch and roll.

In the roll (slope) channel the circuitry and parts are substantially the same as with the pitch (grade) channel and are given primed identification numbers with description substantially the same and not repeated again as a matter of convenience. This slope channel is activated when switch 17 is closed for the meter movement 57' to drive the vehicle roll bar 13 through drive linkage 59' and with rotary switch 19 switched to the desired reference setting.

The power supply 32 of FIG. 5 for the electronically operated grade and slope attitude gyroscopic driven indicator 10 of FIG. 1 or 10' of FIG. 2 is a common type multiple voltage output power supply having a 26–30 volt input that may be either AC or DC. The input voltage is fed to a diode bridge 92 developing a DC output nominally 28 volts DC but tracking the 26–30 volt input with some filtering smoothing thereof by capacitor 93 connected from the output of diode bridge 92 to ground. This diode bridge 92 output is also connected to a conventional inverter 94 (29) converting the input thereto to 20 volt AC at 400 Hz with two opposite phase outputs 95 and 96 therefrom. These two AC outputs are also connected to diode bridge 97 for developing a minus 25 volts filtered by capacitor 98 applied through DC to DC converter 99 for conversion to minus 15 volts filtered by capacitor 100 for minus 15 volts output 101. The minus 15 volt output line is also connected through DC to DC converter 102 to provide a minus 5 volts DC filtered by capacitor 103 at terminal 104. The DC output of diode bridge 92 is also passed through DC to DC converter 105 to develop plus 15 volts DC filtered by capacitor 106 for terminal 107. This plus 15 volts DC is also passed through DC to DC converter 108 to develop plus 5 volts DC filtered by capacitor 109 at terminal 110. The DC output of diode bridge 92 is also passed through DC to DC converter 111 to develop plus 12 volts DC filtered by capacitor 112 for terminal 113. These different power supply terminals along with the 28 volt DC terminal 114 may be used for voltage connections in the indicator circuits 10 or 10' as needed therefore.

Referring to FIGS. 6A–F indicator grade bar 12 and slope bar 13 states are shown for various earth mover vehicle 21 attitudes. With the showing of FIG. 6A both grade and slope are correct with no corrective action called for with the vehicle level or at both slope and grade that bias may have been set for with rotary switches 18 and 19. With FIG. 6B the slope is correct for the slope bias set and the grade is indicated as being high so the dozer blade 23 should be lifted to leave or add material beneath the vehicle. In FIG. 6C the slope bar 13 indication is that the right side is too high and to correct power tilt of blade 23 to the right is called for and the grade is correct. FIG. 6D slope bar position indicates the opposite and the blade should be power tilted left while the grade is correct so the blade should not be raised or lowered. In FIG. 6E while the slope indication is correct the grade is indicated as being low so the blade 23 should be lowered to remove material to lower the vehicle as it moves forward. In FIG. 6F the grade is indicated as being high and the slope bar 13 indication is that the right side is too high and in effect you are in a vehicle diagonal to the slope or grade so it is appropriate to pick one or the other to correct first as has been described for respective deviations hereinbefore.

Referring now to FIG. 7 a push button switch section is shown that has a bank of seven push button switches 115–121 as cancelling and grade reference voltage switches used in place of rotary switch 18 of FIG. 4B. The bank of seven push button switches 115'–121' are used in like manner as slope cancelling and reference voltage switches in place of rotary switch 19. Each bank of seven push button switches 115–121 and 115'–121' has an interconnect linkage 122 and 122' respectively that permits depression of only one push button in each bank of push button switches at a time in a conventional manner. Each of the push button switches 115–121 and 115'–121' drive positions two switches 123A–G (123A'–G') and 124A–G (124A'–G') via common switch drive linkages 125A–G (125A'–G'), respectively, to move the respective switches 123 and 124 of a respective switch push button into or out off switch engagement with contacts 126A–G (126A'–G') connected to reference voltage lines 127 and 127', respectively, and with contacts 128A–G (128A'–G') connected to grade channel 58 and slope channel 58', respectively. When a switch push button 115–121 or 115'–121' is pushed to close switches 123A–G (123A'–G') and a switch 124A–G (124A'–G') the reference voltage of line 127 or 127' is connected through a potentiometer 129A–G (129'–G') to ground with the adjustable tap 130A–G (130'–G') connected through a switch 124A–G (124A'–G') presenting the desired reference to the grade channel line 58 and to the slope channel line 58'. This is effective to give the horizontal grade bar 12 a deflected state setting such as, respectively 0°, 22°, 18.5°, 16°, 14°, 12.5°, and 11.3° to which the earth mover may by such angled state bring the horizontal grade bar 12 back to the zero (center) position. This is with the electronically operated grade and slope attitude gyroscopic driven indicator 10 having been positioned in the earth moving vehicle in a level state both in pitch and roll relative to the vehicle frame and tracks (or supporting wheels) or with the system adjusted to indicate the zero or level state when the vehicle is level in both pitch and roll.

In the roll (slope) channel the circuitry and parts are substantially the same as with the pitch (grade) channel and are given primed identification numbers with description substantially the same and not repeated again as a matter of convenience. This slope channel is activated when switch 17 is closed for the meter movement 57' to drive the vehicle roll bar 13 through drive linkage 59' and with a switch of the slope bank of switches 124A'-G' switched to the desired reference setting.

Just as with the embodiment of FIGS. 4A and 4B the fluctation of voltage levels out of op amp 62 through a predetermined set threshold level causes the op amp 62 to apply a voltage through its output line 65. This acting through the voltage divider switching circuit 66 including resistors 67 and 68 and NPN transistor 69, activates the relay coil circuit with diode 70, capacitor 71 and coil 72 to throw relay switch 73 from positive voltage to negative voltage and back through the threshold in reverse. This is consistent with movement of the horizontal grade bar 12 up or down from the center zero position. Here again operation of the slope roll channel operation is substantially the same to yield the left and right deviations of the vertical slope bar 13 and corrective movements imparted thereto.

Whereas this invention has been described with respect to several embodiments thereof, it should be realized that various changes may be made without departure from the essential contributions to the art made by the teachings hereof.

We claim:

1. A grade and slope attitude gyroscopic driven indicator usable with earth moving equipment comprising:
   a visual display instrument mountable on said equipment having a movable horizontal bar usable as a grade indicating bar, and a movable vertical bar usable as a slope indicating bar;
   position reference indicator means on said instrument for said horizontal grade bar, and position reference indicator means on said intrument for said vertical slope bar;
   first meter means operatively connected to move said horizontal grade bar;
   second meter means operatively connected to move said vertical slope bar;
   gyroscopic means for detecting the orientation of said equipment with respect to an inertial reference;
   electronic grade pick off means from said gyroscopic means;
   electronic slope pick off means from said gyroscopic means;
   grade channel electronic signal sensing, amplifying and drive power means connected to said electronic grade pick off means and to said first meter means;
   slope channel electronic signal sensing, amplifying and drive power means connected to said electronic slope pick off means and to said second meter means;
   grade channel reference voltage switching means connected to said first meter means; and
   slope channel reference voltage switching means connected to said second meter means.

2. The grade and slope attitude gyroscopic driven indicator of claim 1, wherein said grade channel reference voltage switching means connected to said first meter means includes a plurality of resistive voltage dividers connected between a voltage level line and a voltage potential reference source, with reference voltage take offs of said plurality of resistive voltage dividers connected individually respectively to a like plurality of switch contacts in said grade channel reference voltage switching means to provide different biased grade settings of said grade indicating bar.

3. The grade and slope attitude gyroscopic driven indicator of claim 2, wherein said slope channel reference voltage switching means connected to said second meter means includes a plurality of resistive voltage dividers connected between a voltage level line and a voltage potential reference source, with reference voltage take offs of said plurality of resistive voltage dividers connected individually respectively to a like plurality of switch contacts in said slope channel reference voltage switching means to provide different slope settings of said slope indicating bar.

4. The grade and slope attitude gyroscopic driven indicator of claim 3, wherein said plurality of resistive voltage dividers in both said grade and slope reference voltage switching means are a plurality of potentiometers with the taps of the potentiometers being said reference voltage take offs.

5. The grade and slope attitude gyroscopic driven indicator of claim 4, wherein said voltage level line in said grain channel reference voltage switching means is connected to a relay switch switchable between a positive reference voltage contact and a negative reference voltage contact; and an electronic trigger circuit connected to said grade channel electronic signal sensing, amplifying and drive power means connected to said electronic grade pick off means and to said first meter means; and with said electronic trigger circuit connected to selectively power a relay coil that switches said relay switch when a signal voltage in said grade channel varies in a preselected manner.

6. The grade and slope attitude gyroscopic driven indicator of claim 5, wherein said voltage level line in said slope channel reference voltage switching means is connected to a relay switch switchable between a positive reference voltage contact and a negative reference voltage contact, and an electronic trigger circuit connected to said slope channel electronic signal sensing, amplifying and drive power means connected to said electronic slope pick off means and to said second meter means; and with said electronic trigger circuit connected to selectively power a relay coil that switches said relay switch when a signal voltage level in said slope channel passes through a threshold level.

7. The grade and slope attitude gyroscopic driven indicator of claim 6, wherein said grade channel reference voltage switching means includes a grade rotary switch with a plurality of contacts that may be individually switch connected to a rotary contact of said grade rotary switch when rotated to an individual contact of said plurality of contacts.

8. The grade and slop attitude gyroscopic driven indicator of claim 7, wherein said slope channel reference voltage switching means includes a slope rotary switch with a plurality of contacts that may be individually switch connected to a rotary contact of said slope rotary switch when rotated to an individual contact of said plurality of contacts.

9. The grade and slope attitude gyroscopic driven indicator of claim 6, wherein said grade channel reference voltage switching means includes a grade bank off push button switches each active to close or open a switch contact connected to the respective reference voltage take off tap of a potentiometer of said plurality of potentiometers.

10. The grade and slope attitude gyroscopic driven indicator of claim 9, wherein said slope channel reference voltage switching means includes a slope bank of push button switches each active to close or open a switch contact connection to the respective reference voltage take off tap of a potentiometer of said plurality of potentiometers.

11. The grade and slope attitude gyroscopic driven indicator of claim 10, wherein each push button switch includes an additional switch contact connection linkage connected for movement with said switch contact connection to a take off tap for opening and closing movement in unison with said additional switch when the respective push button is pushed; and with said additional switch contact establishing connection of the respective potentiometer to said reference voltage line.

12. The grade and slope attitude gyroscopic driven indicator of claim 11, wherein each bank of push button switches includes an inter-linkage structure permitting closure activation of only one push button switch of each bank of push button switches at a time.

13. The grade and slope attitude gyroscopic driven indicator of claim 6, wherein said grade channel electronic signal sensing, amplifying and drive power means includes first amplifier means having an output connection to said first meter means; said electronic trigger circuit includes an operational amplifier with resistive circuit interconnect from the output of said first amplifier means to both an input and to an output of said operational amplifier; and a preset reference voltage source input connected to said operational amplifier so that with fluctuation of voltage levels out of said first amplifier means through a predetermined set threshold level the signal level causes the operational amplifier to apply a voltage through its output line to act through intervening circuitry to selectively power activate said relay coil to throw said relay switch from positive voltage to negative voltage and back through the threshold in reverse.

14. The grade and slope attitude gyroscopic driven indicator of claim 13, wherein the output of said operational amplifier is connected through a voltage divider circuit connected to a reference voltage source and through transistor means via the transistor emitter to the voltage potential reference source; and with the collector of said transistor connected through diode means, capacitive means and said relay coil to said voltage source.

15. The grade and slope attitude gyroscopic driven indicator of claim 14, wherein said slope channel electronic signal sensing, amplifying and drive power means includes second amplifier means having an output connection to said second meter means; said electronic trigger circuit includes an operational amplifier with resistive circuit interconnect from the output of said second amplifier means to both an input and to an output of said operational amplifier; and a preset reference voltage source input connected to said operational amplifier so that with fluctuation of voltage levels out of said second amplifier means through a predetermined set threhold level the signal level causes the operational amplifier to apply a voltage through its output line to act through intervening circuitry to selectively power activate said relay coil to throw said relay switch from positive voltage to negative voltage and back through the threshold in reverse.

16. The grade and slope attitude gyroscopic driven indicator of claim 15, wherein the output of said operational amplifier is connected through a voltage divider circuit connected to a reference voltage source and through transistor means via the transistor emitter to the voltage potential reference source; and with the collector of said transistor connected through diode means, capacitive means and said relay coil to said voltage source.

17. A grade and slope attitude indicator for use with earth moving equipment, comprising:
 a visual display instrument mountable on said equipment including first means for visually indicating grade and second means for visually indicating slope;
 third means associated with said first means for visually indicating a reference value of grade and fourth means associated with said second means for visually indicating a reference value of slope;
 gyroscopic means for detecting the orientation of said equipment with respect to an inertial reference;
 means responsive to the position of said gyroscopic means for producing a first measured signal indicative of grade and a second measured signal indicative of slope;
 means for generating a first reference signal representative of a desired value of grade to be produced by said equipment and a second reference signal representative of a desired value of slope to be produced by said equipment; and
 means responsive to the difference between said first reference signal and said first measured signal for producing a proportional difference between said first and third visual indicating means and responsive to the difference between said second reference signal and said second measured signal for producing a proportional difference between said second a fourth visual indicating means.

18. A grade and slope attitude indicator for use with earth moving equipment as set forth in claim 17, wherein
 said means for producing a first measured signal includes an electronic grade pick off means and said means for producing a second measured signal includes an electronic slope pick off means;
 said first reference voltage generating means includes grade channel reference voltage switching means and said second reference voltage generating means includes slope channel reference voltage switching means;
 said first visual grade indicating means is a movable horizontal bar and said second visual slope indicating means is a movable bar; and
 said means responsive to the difference between the first reference and measured signals includes first meter means connected to move said horizontal bar and said means responsive to the difference between the second reference and measured signals includes a second meter means connected to move said vertical bar.

* * * * *